United States Patent
Dethier

(10) Patent No.: US 9,797,385 B2
(45) Date of Patent: Oct. 24, 2017

(54) METHOD AND DEVICE FOR PREVENTING DRY-OUT IN A BOILER OF A TOWER SOLAR CONCENTRATION POWER PLANT

(71) Applicant: COCKERILL MAINTENANCE & INGENIERIE S.A., Seraing (BE)

(72) Inventor: Alfred Dethier, Sprimont (BE)

(73) Assignee: COCKERILL MAINTENANCE & INGENIERIE S.A., Seraing (BE)

(*) Notice: Subject to any disclaimer, the term of this patent is extended or adjusted under 35 U.S.C. 154(b) by 0 days.

(21) Appl. No.: 14/915,646

(22) PCT Filed: Aug. 18, 2014

(86) PCT No.: PCT/EP2014/067594
§ 371 (c)(1),
(2) Date: Mar. 1, 2016

(87) PCT Pub. No.: WO2015/032614
PCT Pub. Date: Mar. 12, 2015

(65) Prior Publication Data
US 2016/0305408 A1  Oct. 20, 2016

Related U.S. Application Data

(60) Provisional application No. 61/873,075, filed on Sep. 3, 2013.

(30) Foreign Application Priority Data

Nov. 13, 2013  (EP) ..................................... 13192630

(51) Int. Cl.
*F03G 6/06* (2006.01)
*F22B 1/00* (2006.01)
(Continued)

(52) U.S. Cl.
CPC .............. *F03G 6/065* (2013.01); *F22B 1/006* (2013.01); *F22B 21/02* (2013.01); *F22B 37/261* (2013.01);
(Continued)

(58) Field of Classification Search
CPC ........ F03G 6/065; F22B 29/02; F22B 37/261; F24J 2/07; Y02E 10/41; Y02E 10/44; Y02E 10/46
(Continued)

(56) References Cited

U.S. PATENT DOCUMENTS

| | | | |
|---|---|---|---|
| 4,309,148 A * | 1/1982 | O'Hare | ..................... F03G 6/06 417/18 |
| 2010/0236239 A1 | 9/2010 | Kroizer et al. | |
| 2014/0041839 A1* | 2/2014 | Jackson | .................. F28D 15/00 165/104.21 |

FOREIGN PATENT DOCUMENTS

| | | |
|---|---|---|
| DE | 285489 C | 7/1915 |
| EP | 1526331 A1 | 4/2005 |

(Continued)

*Primary Examiner* — Jorge Leon, Jr.
(74) *Attorney, Agent, or Firm* — Leydig, Voit & Mayer, Ltd.

(57) ABSTRACT

A method for generating a steam cycle at a pressure around 200 bars and a temperature around 600° C., using an industrial steam generator with a solar receiver admitting an incident solar flux around 600 kW/m$^2$, includes: generating a water-steam mixture in the evaporator by transferring heat from the incident solar flux onto the evaporator; separating the water-steam mixture into saturated water and saturated steam in the separator drum, the saturated steam having a pressure from 160 to 200 bars and a temperature from 347 to 366° C.; injecting the feed water into the mixing drum, where it is mixed with the saturated water from the separator drum, the mixed water next returning toward the evaporator via the return pipe provided with the circulation pump, such (Continued)

that the temperature of the mixed water entering the evaporator is below the saturated steam temperature, by a value from 5 to 15° C.

6 Claims, 1 Drawing Sheet

(51) Int. Cl.
| | | |
|---|---|---|
| *F22B 21/02* | (2006.01) | |
| *F22B 37/26* | (2006.01) | |
| *F22G 1/06* | (2006.01) | |
| *F24J 2/07* | (2006.01) | |
| *F22B 29/02* | (2006.01) | |

(52) U.S. Cl.
CPC ............... *F22G 1/06* (2013.01); *F22B 29/02* (2013.01); *F24J 2/07* (2013.01); *Y02E 10/44* (2013.01); *Y02E 10/46* (2013.01)

(58) Field of Classification Search
USPC ............ 60/641.11, 641.15; 122/235.29, 476, 122/488, 489
See application file for complete search history.

(56) References Cited

FOREIGN PATENT DOCUMENTS

| FR | 678909 A | 4/1930 |
|---|---|---|
| GB | 529444 A | 11/1940 |
| WO | WO 2012129195 A2 | 9/2012 |
| WO | WO 2012148656 A1 | 11/2012 |

\* cited by examiner

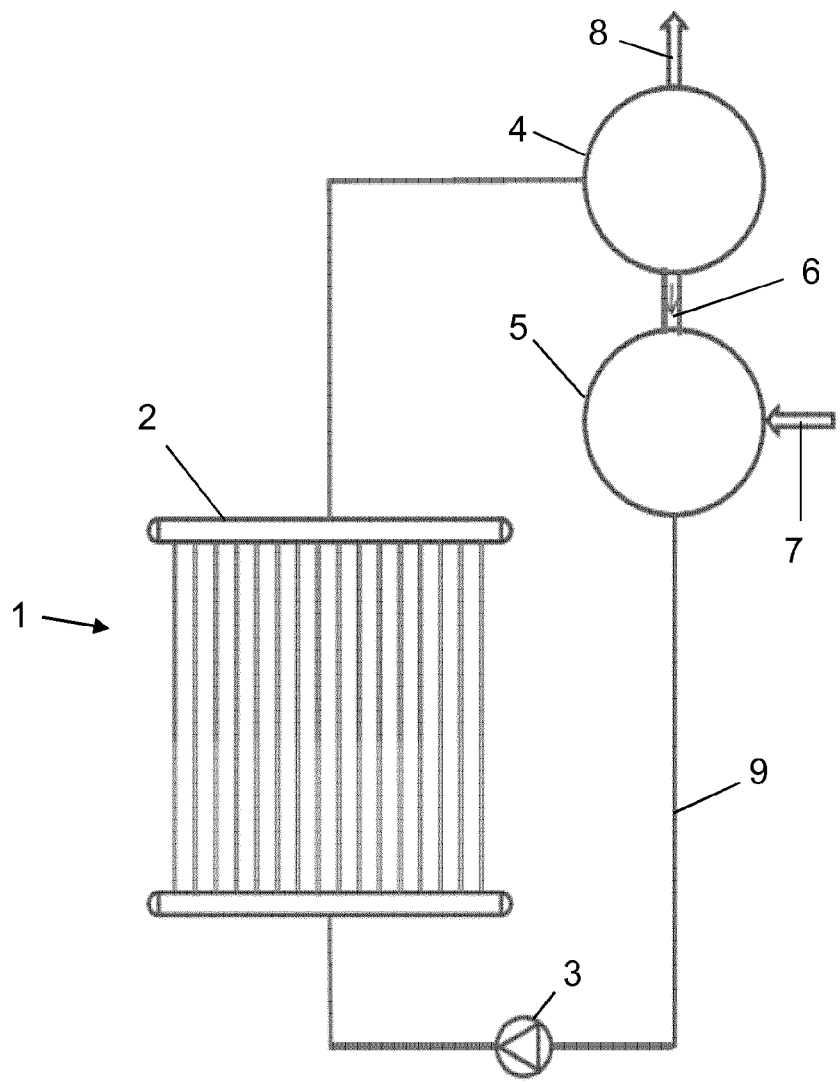

METHOD AND DEVICE FOR PREVENTING DRY-OUT IN A BOILER OF A TOWER SOLAR CONCENTRATION POWER PLANT

CROSS-REFERENCE TO RELATED APPLICATIONS

This application is a U.S. national stage application under 35 U.S.C. §371 of International Application No. PCT/EP2014/067594, filed on Aug. 18, 2014, and claims benefit to U.S. Provisional Patent Application Ser. No. 61/873,075, filed on Sep. 3, 2013, and European Patent Application No. 13 192 630.5, filed on Nov. 13, 2013. The International Application was published in French on Mar. 12, 2015, as WO 2015/032614 A1 under PCT Article 21(2).

FIELD

The present invention relates to the technical field of high-power boilers, in particular for powers greatly exceeding 100 MW, with a steam pressure of close to 200 bars and a steam temperature of nearly 600° C.

In particular, the invention relates to the field of concentration solar power plants, with a single steam cycle, comprising a solar receiver only having one evaporator and one superheater (without reheater).

BACKGROUND

Tower concentration solar power plants are known in which the solar radiation is reflected by a series of mirrors, called heliostats, toward a central solar receiver that converts the solar radiation energy into a hot fluid that can be next used to produce electricity.

Heliostats are provided with two rotation mechanisms making it possible to track the sun and always return the solar flux toward a given point, irrespective of the time of the day and current season.

The solar receiver is installed at the apex of a tower in order to receive the solar radiation from all of the heliostats without a given heliostat hindering the flux reflection of a neighboring heliostat.

The hot flux generated in the solar receiver may be high-pressure and high-temperature steam generated from feed water. The steam can then be used directly in a steam turbine driving an electricity generator.

A solar power plant of this type has a relatively high installation cost, and all solutions are considered in order to reduce that cost.

Among the solutions that are considered, power increase is an important factor due to scale effect.

Another solution is to increase the cycle output: when the output increases, the number of heliostats can be reduced for a same output power, and therefore the height of the tower is reduced, and so forth. The output of a steam cycle increases when the pressure of the cycle and the steam temperature increase.

The powers considered today greatly exceed 100 MW, with a steam pressure of nearly 200 bars and a steam temperature of nearly 600° C. With these performance levels, the solar receiver can comprise only one evaporator and one superheater: re-superheating can therefore advantageously be avoided, and thus is associated costs as well.

The solar receiver is made up of tube walls receiving the solar fluxes from the heliostats and transmitting heat toward the water and/or steam contained in the tubes. Two distinct exchangers form the solar receiver: the evaporator, converting the feed water into saturated steam, and the superheater, increasing the saturated steam temperature until the desired value is reached.

Between the two exchangers is the drum, which is a very important reservoir of a boiler. The drum supplies the evaporator with its water, via a pumping system. Indeed, at these high pressures, natural circulation is no longer possible, the difference in density between the water and the steam being too low. It is additionally necessary to ensure a sufficient circulation rate to avoid dirtying of the evaporator by the salts contained in the water, but also to avoid drying of the inner surface of the tube.

The drying of the inner surface of the tube (dry-out) is also an important data of an evaporator: if it occurs, the exchange coefficient between the water or the water-steam mixture and the tubes decreases abruptly, the tube is no longer cooled down and can no longer discharge the heat received in the form of radiation.

Overheating occurs, which may lead to the destruction of the tube. The effect also exists in certain evaporation regimes called DNB (Departure from nucleate boiling).

The drum receives the feed water at a flow rate equal to the flow rate of the steam produced by the evaporator and that is exported from the drum. The incoming feed water is mixed with the saturated water contained in the drum.

The drum separates the water from the steam coming from the evaporator: the water recirculates toward the evaporator and the steam is exported, after drying in the equipment provided to that end inside the drum.

In the configuration described above, the water sent toward the evaporator via the circulation system is at the saturation temperature. Evaluating the maximum admissible critical flows leads to a major difficulty regarding drying (Dry-Out/DNB) due to the very high pressure.

A boiler arrangement with two drums connected to one another, for example superimposed, is found in a certain number of patents, sometimes very old, for the reasons specified in those documents.

For example:

in the steam generator of FR 678,909, to facilitate the water/steam separation in order to export a dry steam. This concern is also encountered in document DE 285 489;

in the double-drum tube boiler of document GB 529,444, to have better circulatory characteristics;

in the heat recovery steam generator of WO 2012/148656 A1, to reduce the diameter and therefore the thickness of the drum, and to increase the operating flexibility (shorter startup time, operating temperature of the evaporator reached more quickly);

in the heat recovery steam generator of WO 2012/129195 A2, also to reduce the diameter and therefore the thickness of the drum, and consequently the temperature gradient through its wall upon startup, which increases the thermal fatigue on the drum and in turn causes wear thereof in the form of cracks. The thickness reduction of the drum also makes it possible to reduce the manufacturing cost. These concerns are also found in document EP 1 526 331 A1.

Document US 2010/0236239 A1 describes a method and a generator for producing steam for an electric turbine plant using solar radiation. This radiation is directed onto a solar receiver. The solar receiver includes a first section, which has a feed water inlet and is arranged to heat this incoming feed water in order to generate steam by using the directed solar radiation. The feed water flows through a feed water vessel to serve as feed water intake at the inlet of the first section of the receiver. The water is separated from the steam in a steam separation vessel, which is in fluid communication with an outlet of the first section of the receiver. The feed water intake can be selectively preheated by a preheating source other than solar energy, in particular electric preheating, in response to the operating conditions of the system, during daylight hours or at the hourly electricity rate. A forced circulation pump allows the fluid to cross through the preheater. The incident solar flux on the solar receiver is at most in the 130-230 kW/m$^2$ interval in maximum solar mode. Furthermore, the temperature reached by the superheated steam is 540-560° C., at a pressure in the range of 100-140 bars. These operating conditions are too low to cause the dry-out phenomenon of the steam-generating tubes. This document does not teach any solution in the event the steam generator must cope with the difficulties related to very high pressure (from 180 bars to more than 200 bars).

In summary, double-drum steam generators have been known for some time in order to produce a dryer usable steam or to reduce the fatigue of the materials or cost of the system.

In no case is mention made of the problem of drying (Dry-Out/DNB). In all of the scenarios, the boilers covered by these patents work indeed at a much lower pressure and with much lower heat fluxes than in the scenario of the present invention, and therefore without any risk of dry-out.

SUMMARY

An aspect of the invention provides a method for generating a steam cycle at a pressure of more than 160 bars, and at a temperature of about 600° C., using an industrial steam generator having a power of more than 100 MW, with a solar receiver admitting an incident solar flux of about 600 kW/m$^2$, the generator including an evaporator followed by a superheater, a separator drum, situated between the evaporator and the superheater, being vertically superimposed on a mixing drum, the separator drum being including an outlet configured to send the saturated steam toward the superheater and the mixing drum including an inlet configured to intake feed water and being connected to a water return pipe toward the evaporator, the water return pipe including a circulation pump, the separator drum and the mixing drum being in communication via at least one connecting pipe. The method comprises: generating a water-steam mixture in the evaporator by transferring heat from the incident solar flux onto the evaporator; separating the water-steam mixture into saturated water and saturated steam in the separator drum, the saturated steam having a pressure in a range of from 160 to 200 bars and a temperature in a range of from 347 to 366° C.; and injecting the feed water into the mixing drum, where the feed water is mixed with the saturated water from the separator drum, a mixed water next returning toward the evaporator via the water return pipe, wherein a temperature of the mixed water entering the evaporator is below a saturated steam temperature, by a value in a range of from 5 to 15° C.

BRIEF DESCRIPTION OF THE DRAWINGS

The present invention will be described in even greater detail below based on the exemplary figure. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following:

FIG. 1 shows a diagram of the solar receiver with direct steam generation according to an aspect of the invention.

DETAILED DESCRIPTION

An aspect of the invention makes it possible to do away with the dry-out and overheating problems that may occur in high-pressure boiler evaporators.

An aspect of the invention prevents these problems in the case of boilers for concentration solar power plants.

An aspect of the invention provides a boiler for high pressures and temperatures with an improved operating flexibility and lower cost.

An aspect of the invention provides a boiler with two drums having an original use and arrangement.

An aspect of the invention relates to a method for generating high-pressure steam, i.e., a pressure of more than 160 bars, preferably of more than 180 bars, and still more preferably of about 200 bars and at a high temperature, i.e., a temperature of about 600° C. at the superheater, using an industrial steam generator with a solar receiver admitting an incident flux of about 600 kW/m$^2$. Said generator has a power greater than 100 MW, and typically a power of 250 MW. It comprises an evaporator followed by a superheater, a first drum, called separator drum, situated between the evaporator and the superheater, being vertically superimposed on a second drum, called mixing drum, the separator drum being provided with an outlet for sending the saturated steam toward the superheater and the mixing drum being provided with an inlet for the intake of feed water and being connected to a water return pipe toward the evaporator, said pipe being provided with a circulation pump, the separator drum and the mixing drum being in communication via at least one connecting pipe. Said method comprises at least the following successive steps:

a water-steam mixture is generated in the evaporator by transferring heat from the incident solar flux onto the evaporator;

the water-steam mixture is separated into saturated water and saturated steam in the separator drum, the saturated steam having a pressure comprised between 160 and 200 bars and a temperature comprised between 347 and 366° C.;

the feed water is injected into the mixing drum, where it is mixed with the saturated water from the separator drum, the mixed water next returning toward the evaporator via the return pipe provided with the circulation pump, such that the temperature of the mixed water entering the evaporator is below the saturated steam temperature, by a value comprised between 5 and 15° C.

According to one preferred embodiment of the invention, the temperature of the mixed water entering the evaporator is below the saturated steam temperature, by a value comprised between 5 and 10° C.

Another aspect of the present invention relates to an industrial steam generator with a solar receiver admitting an incident solar flux of about 600 kW/m$^2$, said generator having a power of more than 100 MW and typically of about 250 MW, with a single steam cycle, in assisted circulation at a pressure of more than 160 bars, preferably of more than 180 bars, and still more preferably of about 200 bars and at a temperature of about 600° C. at the superheater, comprising:

a solar receiver in the form of an evaporator for generating a water-steam mixture, followed by a superheater for the temperature increase of the saturated steam, a first drum, called separator drum, situated between the evaporator and the superheater, for separating the saturated steam and the saturated water, the separator drum being provided with an outlet to send saturated steam at a temperature comprised between 347 and 366° C. toward the superheater, a second drum, called mixing drum, on which the separator drum is vertically superimposed, the mixing drum being provided with an inlet for the intake of feed water at a temperature substantially lower than the temperature of the saturated water and being connected to a water return pipe toward the evaporator, said pipe being provided with a circulation pump, the separator drum and the mixing drum being in communication via at least one connecting pipe, so as to mix the saturated water coming from the separator drum with the feed water injected into the mixing drum, such that the water thus mixed sent to the inlet of the evaporator is sub-cooled, i.e., at a temperature a few degrees below the saturated steam temperature.

The present invention proposes a method for preventing drying (or dry-out) in a boiler for a concentration solar power plant.

The steam generator used in the present invention makes it possible to generate a single steam cycle at a high pressure (about 200 bars) and high temperature (about 600° C. at the superheater). The installation used as an example here delivers a typical power of 250 MW.

The circuit 1 includes an evaporator 2, a circulation pump 3, a first drum 4, called water/steam separator drum provided with an outlet 8 to export saturated steam, a second drum 5, called mixing drum, provided with a feed water inlet 7. The first drum 4 and the second drum 5 are vertically superimposed and interconnected by one or more connecting tubes 6 allowing the saturated water to flow from the upper drum 4 to the lower drum 5. Upon exiting the separator drum 4, the saturated steam is next sent into a superheater where it is superheated at 600° C. before being sent into a turbine. The expanded and cooled steam is next converted into water in the condenser. This water is next returned, via the mixing drum 5, toward the evaporator 2 by the circulation pump 3, which closes the cycle.

The evaporator for example comprises, in the case of a tower concentration solar power plant (CSP tower), one or more heat exchangers able to transfer the energy of the incident solar flux, reflected by the heliostats, toward the water of the boiler for steam production.

It has appeared that by using a single drum for saturated steam generation, the theoretical calculations, taking the dry-out and DNB criteria into account, show that an admissible heat flux on the exchangers of the evaporator would be very small. Yet for this type of installation, one must be able to admit an incident solar flux for example of about 600 kW/m$^2$.

The inventor has discovered that, to be able to admit such an incident flux, it is essential to cool the circulation water by just a few degrees, typically 5 to 10 degrees.

For example, for a saturated steam output at a pressure of 195 bars and a temperature of 364° C., the temperature of the circulation water should be 359° C. instead of 364° C. to satisfy the dry-out/DNB criteria. This sub-cooling of the water makes it possible to obtain an actual circulation rate of about 10 instead of 6, value without sub-cooling, and to meet the dry-out criterion.

According to the present invention, appropriate sub-cooling of the circulation water is done owing to a configuration with two drums: the upper drum 4 that receives the water-steam mixture coming from the evaporator and exports steam after drying, and the lower drum 5, which receives the feed water and sends that water, mixed with the saturated water from the upper drum 4, toward the circulation system.

The water injected into the mixing drum (220 to 290° C. in the example above) is colder than the saturation water (364° C. in the example above) and the mixing of the two yields a slightly sub-cooled water, satisfying the drying criteria (Dry-Out/DNB).

The use of a second drum, to mix the saturated water with the feed water, makes it possible to obtain the necessary sub-cooling of the water by a few degrees (359° C. instead of about 364° C.), and consequently to increase the circulation rate (10 in nominal operation, calculated according to the enthalpy), for an incident solar flux of about 600 kW/m$^2$.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SYMBOLS 1 boiler circuit
2 evaporator
3 circulation pump
4 water/steam separator drum
5 mixing drum
6 connecting pipe
7 feed water inlet
8 saturated steam outlet
9 water return pipe

The invention claimed is:

1. A method for generating a steam cycle at a pressure of more than 160 bars, and at a temperature of about 600° C., using an industrial steam generator having a power of more than 100 MW, with a solar receiver admitting an incident solar flux of about 600 kW/m$^2$, the generator including an evaporator followed by a superheater, a separator drum, situated between the evaporator and the superheater, being vertically superimposed on a mixing drum, the separator drum including an outlet configuered to send saturated steam toward the superheater and the mixing drum including an inlet configured to intake feed water and being connected to a water return pipe toward the evaporator, the water return pipe including a circulation pump, the separator drum and the mixing drum being in communication via at least one connecting pipe, the method comprising:

generating a water-steam mixture in the evaporator by transferring heat from the incident solar flux onto the evaporator;

separating the water-steam mixture into saturated water and saturated steam in the separator drum, the saturated steam having a pressure in a range of from 160 to 200 bars and a temperature in a range of from 347 to 366° C.; and injecting the feed water into the mixing drum, where the feed water is mixed with the saturated water from the separator drum, a mixed water next returning toward the evaporator via the water return pipe, wherein a temperature of the mixed water entering the evaporator is below a saturated steam temperature, by a value in a range of from 5 to 15° C.

2. The method of claim 1, Wherein the temperature of the mixed water entering the evaporator is below the saturated steam temperature, by a value in a range of from 5 to 10° C.

3. The method of claim 1, wherein the pressure is more than 180 bars.

4. The method of claim 1, wherein the pressure around 200 bars.

5. The method of claim 1, wherein the pressure is no more than 200 bars.

6. An industrial steam generator with a solar receiver admitting an incident solar flux of about 600 kW/m$^2$, the generator having a power of more than 100 MW, with a single steam cycle, in assisted circulation at a pressure of more than 160 bars, the generator comprising:

a solar receiver in the form of an evaporator configured to generate a water-steam mixture;

a superheater situated downstream of the solar receiver and configured to increase a temperature of saturated steam;

a separator drum situated between the evaporator and the superheater, the separator drum being configured to separate the saturated steam and saturated water, the separator drum including an outlet configured to send the saturated steam at a temperature in a range of from 347 to 366° C. toward the superheater; and a mixing drum on which the separator drum is vertically superimposed, the mixing drum including an inlet configured to intake feed water at a temperature substantially lower than a saturated water temperature and the mixing drum being connected to a water return pipe toward the evaporator, wherein the water return pipe includes a circulation pump, and wherein the separator drum and the mixing drum are in communication via at least one connecting pipe, so as to mix the saturated water coming from the separator drum with the feed water injected into the mixing drum, such that the water thus mixed sent to the inlet of the evaporator is sub-cooled, at a temperature below the saturated steam temperature.

\* \* \* \* \*